Jan. 28, 1964     E. M. VAN BUSKIRK ET AL     3,119,768
CROP MATERIAL CLEANING APPARATUS
Filed March 29, 1962     3 Sheets-Sheet 1
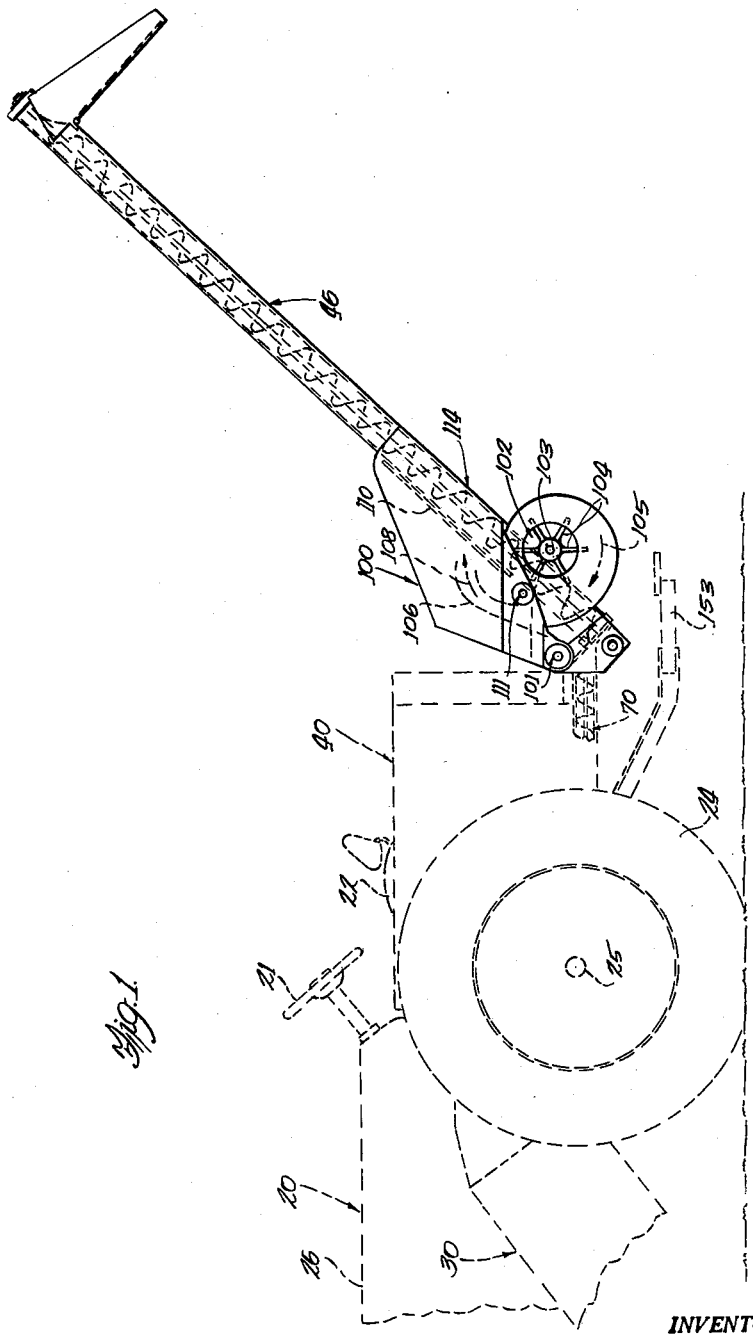
INVENTORS
Ernest M. Van Buskirk
Richard A. DePauw
Paul O. Pippel
Attorney Jan. 28, 1964   E. M. VAN BUSKIRK ET AL   3,119,768
CROP MATERIAL CLEANING APPARATUS
Filed March 29, 1962   3 Sheets-Sheet 2
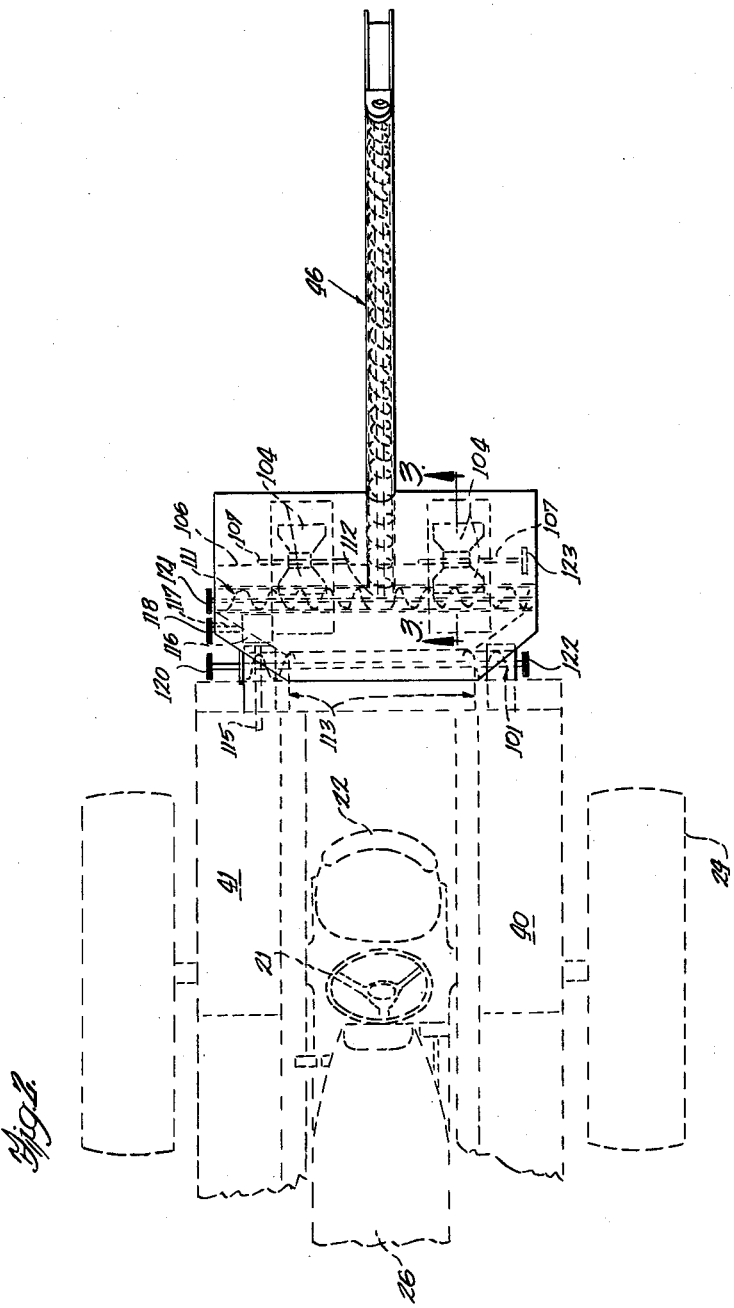
INVENTORS
Ernest M. Van Buskirk
Richard A. DePauw
Paul O. Pippel
Attorney

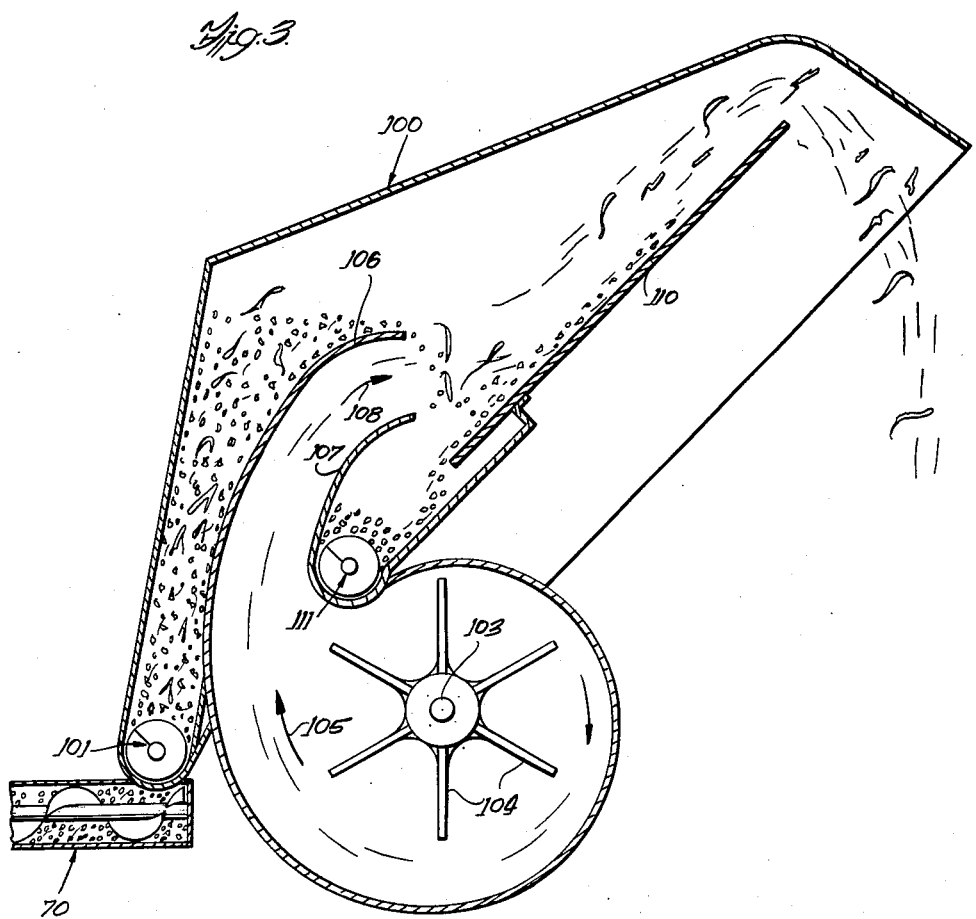

United States Patent Office

3,119,768
Patented Jan. 28, 1964

3,119,768
CROP MATERIAL CLEANING APPARATUS
Ernest M. Van Buskirk and Richard A. De Pauw, both of East Moline, Ill., assignors to International Harvester Company, Chicago, Ill., a corporation of New Jersey
Filed Mar. 29, 1962, Ser. No. 183,547
2 Claims. (Cl. 209—133)

The present invention is directed to crop material cleaning apparatus, and more particularly to an improved cleaning apparatus for separating light trash and dirt from shelled corn as the shelled corn is fed toward a depository.

Recent advances have been made in the apparatus and techniques for picking and shelling corn. A substantially improved picker-sheller is disclosed and claimed in the co-pending application of Elof K. Karlsson, entitled "Crop Picking and Treating Apparatus," filed January 31, 1962, Serial No. 170,075, and assigned to the assignee of this invention. Among the salient improvements set forth in such co-pending application is the complete elimination of any intermediate husking or conveying step, with the picked corn going directly to a shelling apparatus and thence into a depository, such as a trailing wagon. A system of fans and suction units is also set forth and illustrated therein, to provide an air stream which serves to assist in the removal of dust, dirt and light trash from the shelling unit itself. However, in order to deposit as clean a sample as is practical in the trailing wagon, it is desirable to provide some additional cleaning apparatus, located in the conveying system between the shelling unit and the trailing wagon.

It is therefore a primary object of the present invention to provide a cleaning apparatus for crop material which is both efficient and uniform in its operation.

A more detailed object of this invention is the provision of such a cleaning apparatus which lends itself to use with picker-sheller structures such as that disclosed and claimed in the above-identified co-pending application.

Another object of this invention is the provision of a cleaning apparatus which provides an air blast stream of considerably wider extent and greater uniformity than has been provided with conventional fan arrangements, thereby to correspondingly enhance the cleaning of the corn before it is deposited in the wagon.

The foregoing and other objects of the invention are realized by an apparatus which, in one embodiment, is positioned for use with a pair of longitudinal shelled corn conveying augers or feed augers disposed at either side of the picker-sheller, and a first gathering auger disposed transversely at the rear of the picker-sheller to carry the shelled corn centrally to an inlet aperture. Such longitudinal feed conveyors, and the first gathering auger system, are related to analogous equipment disclosed and claimed in the above-identified co-pending application. In accordance with the present invention, a hopper-like chamber is provided in communication with the first gathering auger, and an air stream guide is provided within the hopper in a position so that at least a portion of this guide also assists in directing the shelled corn to a position above the cleaning air stream, which air stream extends substantially across the width of the hopper. Trash and light dirt is entrained in and blown outwardly by the air stream, and the cleaned corn drops downwardly and is gathered centrally by a second gathering auger system, for subsequent movement upwardly and rearwardly by an elevator unit for descent by gravity into a trailing wagon or other suitable depository.

The best mode contemplated for carrying out the invention will now be described. To enable those skilled in the art to make and use the invention, such description is set forth in connection with the accompanying drawings, in the several figures of which like reference numerals identify like elements and in which:

FIGURE 1 is a side view of a preferred embodiment of the invention as related to the disclosure in the above-identified application;

FIGURE 2 is a top view of the novel apparatus illustrated in FIGURE 1; and

FIGURE 3 is a side view, taken on an enlarged scale, of certain of the elements shown in FIGURE 1.

*Structure of the Invention*

To correlate the disclosure of the present application with that of the above-identified co-pending application, reference numerals 20–70 and 153 identify components referenced by the same numerals in the co-pending application, and components of the present invention are identified by numbers 100–123 inclusive.

Portions of a conventional tractor 20 visible in FIGURE 1 include a steering wheel 21, a seat 22, a rear drive tire 24 journalled on the left rear axle 25, and the hood portion 26 of the tractor. Crop material such as ears of corn are picked within picker unit 30, transferred to and shelled within sheller unit 40, and the shelled corn is transported rearwardly by a longitudinal feed auger 70, all as described in the above-identified co-pending application. The major components of the present invention are generally located within a hopper or chamber 100, which includes a first gathering auger 101 disposed transversely of the tractor and sheller at the rear thereof and in communication with each of the longitudinal feed augers, such as auger 70, for receiving the shelled corn and transporting it centrally at the rear of the tractor and its associated components. The communication of the auger system 101 with that of the two longitudinal feed augers is essentially the same as that in the co-pending application and is illustrated by way of example in FIGURE 2 of such application, where a section of the transverse auger 73a is shown communicating with longitudinal feed auger 70. However, in the previous application the shelled corn was passed centrally and allowed to drop downwardly directly into the auger elevator 46 instead of being passed through a cleaning apparatus as disclosed and claimed herein.

More specifically, the cleaning apparatus of the present invention comprises a fan unit 102 including a central shaft 103 and two sets of radial fan blades 104 affixed to and extending outwardly from shaft 103. Upon angular displacement of shaft 103 in the clockwise direction, as shown in FIGURE 1, an air blast or stream is directed as referenced by arrow 105, and thence clockwise and upwardly in a generally semi-circular path between a pair of deflector plates 106 and 107, emerging from the plates as indicated by arrow 108 to provide a cleaning air blast. It is noted that the upper deflector plate 106 comprises not only a portion of the air stream guiding means, but also a guide for the shelled corn which is forced upwardly by the pressure developed by auger 101 to fall over the edge of deflector plate 106 downwardly through the air stream. A blast board 110 is positioned as illustrated to catch the falling corn and deflect it downwardly into a second gatherer conveyor 111, which is positioned to gather the corn centrally to a location where it can fall through an aperture 112 (FIGURE 2) to enter the lowermost portion of the auger elevator 46 and thence be carried upwardly and descend by gravity into a trailing wagon.

Other details of the construction are better seen in FIGURE 2. For example, the extremities of the first gathering auger 101 feed the shelled corn centrally for only a short distance, so that there is a wide inlet aperture through which the corn is forced upwardly into the hopper unit 100. The lateral extent of the inlet aperture is referenced by numeral 113 in FIGURE 2. Also, as there shown, the upper deflector 106 extends across the full lateral dimension of the hopper, whereas the lower deflector assembly of the fan unit is actually comprised of two separate deflector plates, each referenced by numeral 107, and each extending only slightly beyond the width of the individual fan blades 104. The two separate fan blade assemblies are provided and journalled on a shaft to afford a more even distribution of the air stream across the entire width of the hopper unit, thereby to afford well regulated and constant distribution of air through the stream of falling corn which falls downwardly over plate 106 toward conveyor 111.

With respect to the energization means for the longitudinal conveyor 70 and the first transverse conveyor 101, such drive means are disclosed in the above-identified copending application. With respect to the means for energizing the second transverse conveyor 111 and for effecting rotation of shaft 103 of the fan units, in FIGURE 2 a drive shaft 115 is shown. Shaft 115 provides the rotary motion for transferring the clean corn down the right side of the tractor. Rotary energy is translated over shaft 115, gear box 116, and shaft 117 to a first sprocket 118. For clarity of illustration, the drive chain which passes over sprocket 118 and transfers rotary energy to each of sprockets 120 and 121 is not shown on the drawing. Accordingly, the rotation of sprocket 121 is effective to provide the necessary energization of transverse conveyor 111.

Rotation of the first transverse conveyor 101 is also effected by the energy transferred over sprocket 120, for a sheave 122 is affixed to the other end of this conveyor. A belt, not illustrated, effects translation of energy between sheaves 122 and 123, thereby to effect rotation of shaft 103 and impart rotary motion to fan blades 104.

*Operation of the Invention*

As the tractor 20 with the picking and shelling units is mounted thereon is directed through a field of standing corn, the ears are picked in units such as picking unit 30, and shelled in sheller units such as 40 and 41, and the shelled corn is then transported rearwardly to transverse conveyor or pathering means 101, whence it is directed centrally into the front central portion of hopper unit 100. The shelled corn enters the wide entrance aperture as depicted in FIGURE 2, and the pressure of the screw flight on auger 101 forces the corn upwardly between the front portion of hopper 100 and the arcuate plate 106.

In accordance with the inventive teaching, shaft 103 is rotated to provide for rotation of each of the sets of fan blades 104, thereby providing an air stream or blast in the direction of arrows 105 and 106, which blast is directed substantially horizontally outwardly through aperture 114 at the top rear of hopper unit 100. As the shelled corn falls over the edge of plate 106, the corn, which is heavier than the light trash and dirt, descends under the force of gravity downwardly and strikes the blast board 110, whence the corn is guided into the second auger 111 which carries it centrally for movement upward by the auger elevator 46. The trash and light dirt, which is much lighter than the shelled corn, is entrained in the air stream and carried with the moving air outwardly through aperture 114, to fall on the ground behind the machine. Accordingly, a clean sample of corn is passed outwardly through the auger elevator and out the spout to fall into the trailing wagon or other suitable depository.

The invention is most efficient and provides for air separation in depth of trash from cleaned corn. That is, the blast stream is extremely uniform not only across the entire lateral extent of the hopper unit, but also from the edge of the deflector plates 106 and 107 to the exit aperture 114. The substantial uniformity of the cleaning air stream throughout this entire extent contributes significantly to the effective removal of trash, dust and light dirt from the shelled corn before it is passed upwardly through the auger elevator to the trailing wagon.

While only a particular embodiment of the invention has been described and illustrated, it is apparent that modifications and alterations may be made therein. It is, therefore, the intention in the appended claims to cover all such modifications and alterations as may fall within the true spirit and scope of the invention.

What is claimed is:

1. For use with a corn shelling arrangement which delivers a mixture of shelled corn together with dirt and light trash through an inlet aperture, a cleaning apparatus comprising
   means defining a surface inclined relative to the horizontal,
   means defining a discharge aperture above said inclined surface,
   means including upper and lower guide members for directing an air stream substantially horizontal to strike the inclined surface at an acute angle, causing a cleaning air movement upwardly over the top of said inclined surface and through said discharge aperture,
   and means for spreading the mixture and for moving said mixture over said upper guide member to fall with minimum velocity over the edge of said upper guide member into said air stream, whereupon the trash and light dirt is carried by the cleaning air movement upwardly and over the edge of the inclined surface, and the shelled corn drops downwardly below said inclined surface into a suitable collection means.

2. For use in combination with a system which includes means for delivering shelled corn including trash and dirt to an input location, and means for receiving shelled corn at an output location and transporting it to a suitable depository, a shelled corn cleaning arrangement which comprises:
   a hopper unit for receiving shelled corn at said input location and discharging shelled corn at said output location, including a deflector plate disposed at an angle relative to the horizontal, the lower portion of said deflector plate being positioned above said output location, and said hopper unit defining a trash discharge aperture above said deflector plate;
   means, including upper and lower guide plates, for directing an air blast against said deflector plate and thus providing an air displacement along the upper portion of said deflector plate and through said trash discharge aperture;
   and means, including said upper guide plate, for directing the shelled corn, trash and dirt received at said input location over said upper guide plate to thereafter descend with minimum velocity through said air blast, thereby effecting separation of the dirt and trash from the shelled corn as the trash and dirt is blown out said discharge aperture, and the clean shelled corn drops to said output location.

References Cited in the file of this patent

UNITED STATES PATENTS

| | | |
|---|---|---|
| 2,162,392 | Solomon | June 13, 1939 |
| 2,834,061 | Van Doorn | May 13, 1958 |
| 2,957,293 | Roscoe | Oct. 25, 1960 |
| 3,024,907 | Carruthers | Mar. 13, 1962 |
| 3,044,619 | Knolle | July 17, 1962 |